United States Patent [19]

Wellner et al.

[11] 4,279,793

[45] Jul. 21, 1981

[54] WATER-HARDENABLE MIXTURES

[75] Inventors: Wolfgang Wellner; Manfred Hajek, both of Cologne, Fed. Rep. of Germany

[73] Assignee: Bayer Aktiengesellschaft, Fed. Rep. of Germany

[21] Appl. No.: 99,408

[22] Filed: Dec. 3, 1979

[30] Foreign Application Priority Data

Dec. 11, 1978 [DE] Fed. Rep. of Germany ....... 2853477

[51] Int. Cl.$^3$ ...................... C08G 69/00; C08G 69/26

[52] U.S. Cl. .................................. 260/18 R; 106/33; 156/331.1; 252/188.3 R; 427/340; 528/220; 528/246; 528/249; 528/345; 528/352

[58] Field of Search .......................... 106/33; 156/331; 252/188.3 R; 427/340; 260/18 R; 528/220, 246, 249, 345, 353

[56] References Cited

U.S. PATENT DOCUMENTS 3,832,330   8/1974   Dixon et al. ......................... 528/353

Primary Examiner—Maurice J. Welsh
Attorney, Agent, or Firm—Connolly and Hutz

[57] ABSTRACT

A water hardenable mixture comprising a blocked polyamine and cyclic anhydride compounds.

9 Claims, No Drawings

WATER-HARDENABLE MIXTURES

This invention relates to water-hardenable mixtures of reversibly blocked polyamines and compounds containing at least two cyclic anhydride groups in the molecule. Mixtures of this type are characterised by being stable on storage and activated by contact with water, when they rapidly react at room temperature to form polyamides.

The reaction of amines with cyclic anhydrides is very rapid and in most cases proceeds at room temperature to yield carboxylic acid amides in addition to free carboxyl groups:

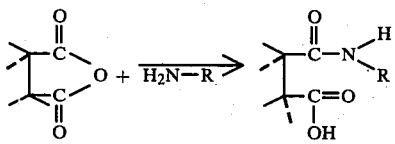

It is only at elevated temperatures that the cyclic imide is formed with elimination of water.

That very rapid reaction step prevents the formation of mixtures of compounds which contain amine structures and cyclic anhydride structures although there is a demand for mixtures which are stable on storage, e.g. for the production of one-package systems.

It has now been found this kind of mixtures which are stable on storage may be obtained by using reversibly blocked polyamines. Such mixtures of compounds having cyclic anhydride structures and reversibly blocked polyamines have a surprisingly high stability on storage, but show an extremely high reactivity when water is added. The water required for hardening may also be introduced as water bound to fillers. The mixtures according to the present invention will also react when they are exposed to atmospheric moisture. Thus a dry surface rapidly forms and hardening reaches progressively lower layers. The properties of the polyamides obtained may be varied within wide limits by suitable choice of the reactive compound and by additives.

The present invention therefore relates to water-hardenable mixtures comprising:

(A) at least one reversibly blocked polyamine; and
(B) at least one compound having at least two cyclic anhydride groups.

The present invention relates to moisture-hardening mixtures which are characterised by the fact that the polyamine used is reversibly blocked, i.e. the molecule contains no reactive NH or $NH_2$ groups. Masking of the amine component is obtained by reacting the polyamines with carbonyl compounds, i.e. aldehydes or ketones, and removing the reactive hydrogen atoms by a condensation reaction accompanied by the elimination of water.

Suitable blocked polyamines contain one or more of the following structural elements:

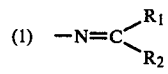

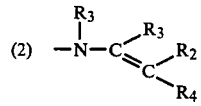

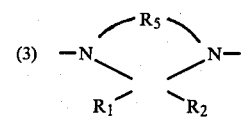

wherein
$R_1$ to $R_4$, which may be the same or different, each represents H, an alkyl group, preferably having from 1 to 10 carbon atoms more preferably 1–4 carbon atoms, a cycloalkyl group, preferably having from 4 to 8 carbon atoms, or an aryl group, preferably having from 6 to 8 carbon atoms; and
$R_5$ represents an alkylene group, preferably having from 2 to 4 carbon atoms.

Blocking of the amino groups with carbonyl groups accompanied by elimination of water is carried out by known methods. The condensation of primary amino groups with aldehydes or ketones results in aldimines or ketimines (I).

When a reaction with secondary amines is carried out at the same time, enamine functions (II) are obtained. Polyamines in which the amino functions are separated, e.g. by 2 or 3 carbon atoms, may give rise to cyclic aminal structures (III). The water produced in the reaction is normally removed azeotropically, using a carrier, or the carbonyl component may itself fulfil this function.

Suitable blocking agents for the polyamines include, for example, the following aldehydes: aliphatic aldehydes, such as formaldehyde, acetaldehyde, propionaldehyde, butyraldehyde, isobutyraldehyde, trimethyl acetaldehyde, heptyl aldehyde or 3-formyl heptane, or aromatic aldehydes, such as 1,2,5,6-tetrahydrobenzaldehyde, hexahydrobenz aldehyde or benzaldehyde.

The following are examples of suitable ketones: acetone, methyl ethyl ketone, methyl propyl ketone, diethyl ketone, methyl isopropyl ketone, methyl isobutyl ketone, t-butyl-methyl ketone, diisobutyl ketone, cyclopentanone and cyclohexanone.

Numerous compounds which have at least two NH functions are suitable for use as polyamines, particularly primary or secondary polyamines such as low molecular weight aliphatic polyamines, preferably having from 2 to 10 carbon atoms, aliphatic-aromatic polyamines preferably having from 7 to 9 carbon atoms, aromatic polyamines, preferably having from 6 to 10 carbon atoms, cycloaliphatic polyamines, preferably having from 5 to 10 carbon atoms, and heterocyclic polyamines, preferably having from 4 to 6 ring carbon atoms, and containing hetero atoms, such as N and/or O and/or S in the ring most preferably diamines. The following are examples: ethylene diamine, 1,3-diaminopropane, N,N'-dimethyl ethylene diamine, diethylene triamine, bis-(2-methylaminoethyl)-amine, methyl-bis-(2-methylaminoethyl)-amine, triethylene tetramine, tetraethylene pentamine, pentaethylene hexamine, propylene diamine, dipropylene triamine, tripropylene tetramine, 1-amino-3-methylaminopropane, bis-(3-aminopropyl)-amine, bis-(3-aminopropyl) methylamine, 1,4-diaminobutane, 1,6-diaminohexane, 2,5-trimethyl-hexane diamine, 2,2,4- and 2,4,4-trimethyl-hexamethylene diamine, 1,4-butanol-bis-(3-aminopropyl ether), 1,3-and 1,4-diaminocyclohexane, 4,4'-diamino-dicyclohexyl methane, 1,3- and 1,4-xylylene diamine, isophorone diamine and 1,3- and 1,4-diaminobenzene.

Higher molecular weight polyamines may also be used, preferably having molecular weights of from 1,000 to 6,000, e.g. those obtained by the reaction of polyether polyols, preferably having molecular weights of from 500 to 6,000, with ammonia and hydrogen under pressure in the presence of suitable catalysts or by the reaction of organic isocyanates containing nitro groups, preferably p-nitrophenyl isocyanate, with polyether polyols, followed by reduction. Another variation involves the reaction of prepolymers which contain isocyanate end groups with amines which are already blocked, but still contain isocyanate-reactive groups, e.g. OH or NH.

Sterically hindered polyamines and/or sterically hindered carbonyl compounds are particularly suitable. Polyaldimines and polyketimines modified by Michael addition may also be used.

The polyanhydride compounds used may be various compounds containing two or more cyclic anhydride structures.

Low molecular weight polyfunctional cyclic anhydrides may therefore be used.

It is particularly preferred to use aromatic, polyfunctional, preferably cyclic dianhydrides and cyclic anhydrides, and among these, pyromellitic acid dianhydride and benzophenone-3,4,3',4'-tetracarboxylic acid anhydride are particularly preferred. They may, in particular, be used as solutions in suitable solvents.

Relatively high molecular compounds having at least two cyclic anhydride groups are especially preferred, particularly those having molecular weights of from 1,000 to 10,000.

These polyanhydrides may be prepared by the reaction of mono-unsaturated compounds having at least one cyclic anhydride group in the molecule and α-olefins or poly-unsaturated compounds by known polymerization processes.

The following are suitable α-olefins: ethylene, 1-octene, 1-decene, styrene, vinyl chloride, vinyl acetate, vinyl ether and derivatives of acrylic and methacrylic acids, such as esters and nitriles.

The following polyunsaturated compounds may be used: oligomers of butadiene and polyunsaturated fatty acid derivatives, e.g. wood oil.

The unsaturated cyclic anhydride compounds used may advantageously be compounds corresponding to the following general formula:

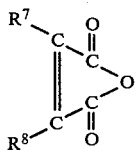   (VII)

wherein
R$^7$ and R$^8$, which may be the same or different, each represents hydrogen or a C$_1$–C$_4$ alkyl group. Maleic acid anhydride is preferably used.

The relatively high molecular weight polyanhydrides may also be prepared by the reaction of cyclic dianhydrides with polyols based on polyethers or polyesters at temperatures above 100° C. the ratio of OH to anhydride groups being preferably 1:2.

Pyromellitic acid dianhydride and benzophenone-3,4,3'',4'-tetracarboxylic acid anhydride are particularly suitable for this variation of the process.

Commercial polyethers and polyesters having molecular weights of from 500 to 6,000 which contain primary and/or secondary hydroxyl groups are suitable polyol components for this variation of the process.

The mixtures according to the present invention are prepared by mixing components (A) and (B) which may be dissolved in suitable solvents.

The mixtures according to the present invention rapidly undergo reaction on contact with water. The amine reacts very rapidly with the cyclic anhydride functions to form a polycondensate.

In the mixtures according to the present invention, the proportions of the two reactants may vary within wide limits and generally ranges from 0.6 to 1.5 equivalent of anhydride per equivalent of the amine.

The reaction may be accelerated by heat and/or catalysts. Suitable catalysts include inorganic and organic acids, e.g. aliphatic and aromatic mono carboxylic acids, such as acetic acid, dodecan carboxylic acid, phenyl acetic acid or benzoic acid, as well as compounds which contain several carboxyl groups in the molecule, e.g. oxalic acid, succinic acid, polyacrylic acid and acid ion exchange resins.

The present mixtures may contain inert components in addition to the reactants. Thus, the different properties required for certain applications may be obtained, e.g. by the addition of solvents and/or plasticizers. Inorganic and organic fillers may also be added. The substances may be optimized for various possible uses by the addition of for example pigments, age resistors.

The mixtures according to the present invention may be used for the production of films, paints, coatings, sealing masses, impregnating compounds, fibres and adhesives. Coatings or films of the mixtures according to the present invention, with or without solvent, may be applied permanently or removably to suitable substrates, such as metals, glass, wood, plastics, paper or leather, optionally with the addition of bonding agents, such as silanes. Summary of the blocked polyamines and polyanhydrides used in the Examples:

Blocked polyamines

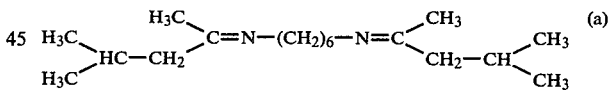

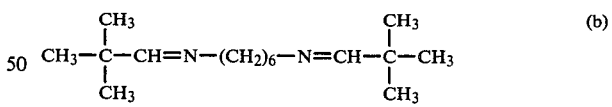

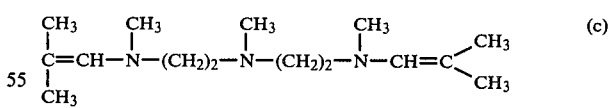

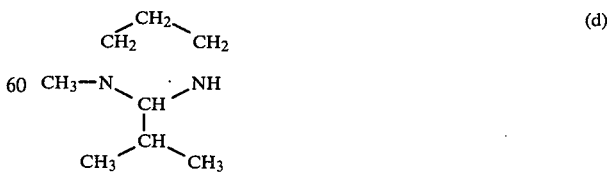

Polyanhydrides

Prepolymers carrying cyclic dicarboxylic acid anhydride groups.

(E) Reaction products obtained by heating oligomeric butadiene oil and maleic acid anhydride (1:1) in isomerization and addition reactions. Viscosity of such a reaction product ca. 5,300 mPa.s.

(F) Addition product obtained from 890 g of wood oil and 238 g of maleic acid anhydride after 2 hours heating to ca. 90° C. The temperature must not exceed a peak of 120° C. in the course of this exothermic reaction. Viscosity of the reaction Viscosity of the reaction product ca. 43,500 mPa.s.

(G) Prepolymer containing anhydride end groups obtained from the reaction of 500 g of a linear polypropylene glycol having a molecular weight of ca. 2,000 and 109 g of pyromellitic acid dianhydride. An exothermic reaction start when the reaction mixture is heated to from 120° to 130° C., and the temperature rose to ca. 145° C. The mixture was heated for a further 12 hours at from 150 to 155° C. and then used.

(H) Prepolymer containing anhydride end groups from the reaction of 800 g of the polyether having an average molecular weight of ca. 4,800 based on propylene oxide and ethylene oxide and containing from ca. 70 to 80% primary OH groups and started on trimethylol propane, and 109 g of pyromellitic acid dianhydride. The reaction mixture was heated to ca. 125° C. with vigorous stirring and the temperature rose to ca. 150° C. in the resulting exothermic reaction. The temperature was maintained at from 150° to 155° C. for a further 8 hours after the reaction had died down. Undissolved constituents were then removed by suction filtration and the liquid prepolymer was used for further experiments.

EXAMPLE 1

0.1 mol of ketimine (a) was added to 0.1 mol of a 20% solution of benzophenone-3,4,3',4'-tetracarboxylic acid dianhydride in absolute dimethyl formamide. The mixture was stable on storage for several hours with exclusion of atmospheric moisture. When the solution was spread coated on surfaces and brought into contact with atmospheric moisture at room temperature, clear and dry films were formed after a few hours. After 15 minutes stoving at 200° C., the films were found to have very high solvent resistance. Hardness of films: 217 sec pendulum hardness (according to König) DIN 53 157.

EXAMPLES 2 to 8

The liquid components of polyanhydride and blocked polyamine were mixed according to the composition shown in Table 1 and then tested.

TABLE 1

| Example | Parts, by weight | Polyhydride | Parts, by weight | Polyamine |
|---|---|---|---|---|
| 2 | 100 | F | 5.8 | a |
| 3 | 100 | E | 5.3 | b |
| 4 | 100 | E | 3 | d |
| 5 | 100 | F | 30 | a |
| 6 | 100 | F | 27 | b |
| 7 | 100 | F | 28 | c |
| 8 | 100 | F | 15 | d |

| Example | Stability on storage at room temperature d = days | Formation of skin at 50% relative humidity after | Pendulum hardness sec./layer thickness | Shore hardness |
|---|---|---|---|---|
| 2 | 1 d | ca. 50 min. | 55/48 μm | |
| 3 | 60 d | immediately | 33/38 μm | |
| 4 | 1 d | immediately | 21/148 μm | |
| 5 | 1 d | immediately | 65/52 μm | Shore A 55 |
| 6 | 60 d | ca. 50 min. | 104/32 μm | Shore A 33 |
| 7 | 14 d | immediately | | |
| 8 | 1 d | immediately | 76/205 μm | Shore D 50 |

EXAMPLE 9

100.0 g of product (F) and
30.0 g of ketimine (a) are mixed.

When moisture is excluded, the mixture may be processed for about 8 hours at room temperature. On contact with atmospheric moisture, a skin forms on the surface within a few seconds. Laminar products, such as coatings and films, have a Shore A hardness of ca. 50 and are distinguished by the very low permeability thereof to water vapour. Passage of water vapour (gradient 93/0):

$6 \times 10^{-4}$ g/day/cm$^2$ at 1 mm layer thickness.

EXAMPLE 10

100.0 g of product (F),
10.0 g of titanium dioxide,
0.2 g of carbon black,
5.0 g of xylene,
1.0 g of zeolite powder (molecular sieve) and
27.0 g of product (b) are mixed to form a caoting compound which is ready for use.

The mixture may be stored for at least 6 months at room temperature if moisture is excluded. On contact with atmospheric moisture (50% and 20° C.), a skin is formed on the surface after 1 hour. Shore A hardness=b 35.

EXAMPLE 11

100.0 g of product (E),
50.0 g of trioctyl phosphate,
10.0 g of hydrogenated castor oil (thickener),
400.0 g of powdered chalk
10.0 g of zeolite powder (molecular sieve),
2.0 g of carbon black,
2.0 g of oleic acid and
5.3 g of product (b) are mixed to form a sealing compound which is ready for use.

The sealing compound may be stored for at least 6 months at room temperature if moisture is excluded. On contact of the surface with atmospheric moisture (50% and 20° C.), a skin forms after 1 hour.

EXAMPLE 12

Influence of the molar ratio on the properties of the coating material.

| Composition and properties | | | |
|---|---|---|---|
| Polyanhydride | 100 g | 100 g | 100 g |
| methyl ethyl ketone | 30 g | 30 g | 30 g |
| ketimine (a) | 11.5 g | 23 g | 34.5 g. |
| Equivalent ratio NH$_2$/anhydride | 1:1 | 2:1 | 3:1 |
| Film surface | tacky | dry | dry |
| Shore A | — | 76 | 70 |

The mixtures prepared as described above may be processed for several hours (from 4 to 16 hours) with exclusion of moisture and very rapidly form a skin (ca. 30 seconds), e.g. on contact with atmospheric moisture.

EXAMPLE 13

A two-package composition material having a long pot life is prepared by mixing 100 g of polyanhydride (H) and 30 g of methyl ethyl ketone with 5 g of product (b).

This mixture may be stored for ca. 14 days at 25° C. with exclusion of moisture. On access of atmospheric moisture, a skin forms within 30 minutes.

We claim:

1. A water-hardenable mixture comprising
   (A) at least one reversibly blocked polyamine; and
   (B) at least one compound having at least two cyclic carboxylic acid anhydride groups.

2. A mixture as claimed in claim 1, wherein the polyamine is blocked with a carbonyl compound.

3. A mixture as claimed in claim 1, wherein the reversibly blocked polyamine is derived from a polyamine having a molecular weight of from 60 to 6,000.

4. A mixture as claimed in claim 1 wherein the polyamine is blocked with an aldehyde or ketone.

5. A mixture as claimed in claim 1, wherein component (B) has a molecular weight of from 198 to 10,000.

6. A mixture as claimed in claim 1, wherein component (B) is the reaction product of polyol with a cyclic dianhydride.

7. A mixture as claimed in claim 1, wherein component (B) is obtained by the copolymerization of an unsaturated cyclic anhydride with a polyunsaturated compound or an α-olefin.

8. A mixture as claimed in claim 7, wherein the unsaturated cyclic anhydride is maleic acid anhydride and the α-olefin is at least one member selected from the group consisting of ethylene, 1-octene, 1-decene, styrene, vinyl chloride, vinyl acetate, vinyl ether (meth)acrylic acid ester and (meth)acrylic nitrile and the polyunsaturated compound is oligomeric butadiene or wood oil.

9. A coating, sealing or impregnating composition containing the mixture as claimed in claim 1.

* * * * *